United States Patent
Preller

(10) Patent No.: US 6,434,023 B2
(45) Date of Patent: Aug. 13, 2002

(54) METHOD FOR SWITCHING OFF A SWITCHED-MODE POWER SUPPLY IN THE EVENT OF SHORT-CIRCUIT, AND A SWITCHED-MODE POWER SUPPLY

(75) Inventor: Peter Preller, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/761,236

(22) Filed: Jan. 17, 2001

(30) Foreign Application Priority Data

Jan. 20, 2000 (DE) .......................... 100 02 326

(51) Int. Cl.[7] .................. H02M 3/335; H02M 7/44; H02M 7/68
(52) U.S. Cl. .................. 363/21.04; 363/97; 363/56.11; 363/56.1
(58) Field of Search .................. 363/21.04, 21.05, 363/97, 56.09, 56.11, 56.1

(56) References Cited

U.S. PATENT DOCUMENTS 4,905,136 A * 2/1990 Tanaka ..................... 363/124
5,661,642 A * 8/1997 Shimashita ............... 363/21.15
5,969,954 A * 10/1999 Zaitsu ........................ 363/16
6,166,932 A * 12/2000 Otaoshi ..................... 363/56
6,304,464 B1 * 10/2001 Jacobs et al. ............ 363/21.12
6,307,762 B1 * 10/2001 Shiobara .................... 363/69

FOREIGN PATENT DOCUMENTS

| JP | 1-278 228 A | 11/1989 | ............ H02H/7/12 |
| JP | 08 126 307 A | 5/1996 | ............ H02M/3/28 |

\* cited by examiner

*Primary Examiner*—Bao Q. Vu
(74) *Attorney, Agent, or Firm*—Laurence A. Greenberg; Werner H. Stemer; Gregory L. Mayback

(57) ABSTRACT

In order to achieve complete short-circuit protection irrespective of a location of a short-circuit in a switched-mode power supply having a controllable switch in a primary circuit, the controllable switch is opened when a voltage drop across an electrolytic capacitor in a primary circuit falls below a threshold value which can be predetermined. For this purpose, a capacitive voltage device containing two capacitances is connected in parallel with the electrolytic capacitor. A potential at a center tap of the capacitive voltage divider is compared in a comparator with a reference voltage, which opens the controllable switch when the potential at the center tap falls below the reference voltage.

8 Claims, 3 Drawing Sheets

METHOD FOR SWITCHING OFF A SWITCHED-MODE POWER SUPPLY IN THE EVENT OF SHORT-CIRCUIT, AND A SWITCHED-MODE POWER SUPPLY

BACKGROUND OF THE INVENTION

Field of the Invention

The invention relates to a method for switching off a switched-mode power supply in the event of a short-circuit, and to a switched-mode power supply. In the switched-mode power supply, an AC voltage is applied to AC voltage inputs of a bridge rectifier to whose DC outputs a parallel circuit containing an electrolytic capacitor and a series circuit formed of a primary winding of a transformer and of a controllable switch is connected. A control input of the controllable switch is connected to the output of a control unit, and in which a series circuit containing a first diode and a first capacitance is connected in parallel with the secondary winding of the transformer.

Switched-mode power supplies that produce a regulated output voltage are equipped with a transformer to whose primary winding the DC voltage outputs of a rectifier, for example a bridge rectifier, can be connected by a controllable switch which is switched by a control unit or by a regulator. A series circuit containing a diode and a capacitance across which the regulated output voltage can be tapped off is connected in parallel with the secondary winding of the transformer. The controllable switch is opened and closed by switching pulses produced by the control unit or by the regulator, depending on the load on the output of the switched-mode power supply.

By virtue of their construction, switched-mode power supplies are resistant to short-circuits on their output. It is known for the primary current through the controllable switch and through the primary winding to be measured by a shunt resistor in order to ensure short-circuit protection on the primary side, as well.

A disadvantage of such short-circuit protection is that losses occur in the shunt resistor.

SUMMARY OF THE INVENTION

It is accordingly an object of the invention to provide a method for switching off a switched-mode power supply in the event of a short-circuit, and a switched-mode power supply which overcome the above-mentioned disadvantages of the prior art devices and methods of this general type, in which only a negligibly small power loss occurs.

With the foregoing and other objects in view there is provided, in accordance with the invention, a method for switching off a power supplying device in an event of a short-circuit. The method contains the steps of providing a switched-mode power supply including:

a bridge rectifier having AC voltage inputs receiving an AC voltage and DC outputs;

an electrolytic capacitor;

a transformer having a primary winding and a secondary winding;

a first series circuit containing the primary winding of the transformer and a controllable switch having a control input, the first series circuit is connected in parallel with the electrolytic capacitor and together define a parallel circuit connected to the DC outputs of the bridge rectifier;

a control unit having a control input and an output connected to the control input of the controllable switch; and a second series circuit containing a diode and a capacitance and connected in parallel with the secondary winding of the transformer; and opening the controllable switch if a voltage drop across the electrolytic capacitor falls below a predetermined threshold value.

With regard to the method, the controllable switch is opened when the voltage drop across the electrolytic capacitor falls below a threshold value that can be predetermined.

With the foregoing and other objects in view there is further provided, in accordance with the invention, a switched-mode power supply. The switched-mode power supply contains a bridge rectifier having AC voltage inputs for receiving an AC voltage and has DC outputs. An electrolytic capacitor and a transformer having a primary winding and a secondary winding are provided. A first series circuit containing the primary winding of the transformer and a controllable switch having a control input is provided. The first series circuit is connected in parallel with the electrolytic capacitor and together define a parallel circuit connected to the DC outputs of the bridge rectifier. A control unit having a control input and an output is connected to the control input of the controllable switch. A second series circuit containing a diode and a first capacitance and is connected in parallel with the secondary winding of the transformer. A capacitive voltage divider formed of a second capacitance, a center tap, and a third capacitance, and the capacitive voltage divider is connected in parallel with the electrolytic capacitor. A comparator having a first input is connected to the center tap of the capacitive voltage divider, a second input is to be connected to a reference voltage, and an output is connected the control input of the control unit.

With regard to the circuit, the object is achieved in that a capacitive voltage divider containing the second and the third capacitance is connected in parallel with the electrolytic capacitor, and that the center tap of the voltage divider is connected to the first input of the comparator. The second input of the comparator receives a reference voltage and the output of the comparator is connected to the control input of the control unit.

The invention is based on the knowledge that an electrolytic capacitor represents a series circuit containing an equivalent series resistance, an inductance and the actual capacitance. Since the primary current rises in the event of a short-circuit, the voltage across the electrolytic capacitor falls owing to the voltage drop across its equivalent series resistance. The voltage across the electrolytic capacitor is compared in a comparator with a reference voltage, which is used as a threshold value. If the voltage across the electrolytic capacitor falls as a result of a short-circuit, irrespective of the point at which the short-circuit is located, to the threshold value, then the controllable switch is opened, and the switched-mode power supply is thus switched off.

The invention therefore represents perfect short-circuit protection for a switched-mode power supply since it switches the switched-mode power supply off when a short-circuit occurs at any point. A major advantage of the invention is that there is no longer any need for a shunt resistor, which produces losses. The short-circuit protection according to the invention operates with virtually no losses.

In accordance with an added feature of the invention, a resistor is connected between the second capacitance and the third capacitance of the capacitive voltage divider.

In accordance with an additional feature of the invention, a further resistor having a first terminal is connected to the first input of the comparator and a second terminal is to be connected to a voltage for applying the voltage to the first input of the comparator. A further diode is connected in parallel with the second capacitance of the capacitive voltage divider that is also connected to the first input of the comparator.

In accordance with another feature of the invention, a fourth capacitance is connected in parallel with the controllable switch.

In accordance with a further feature of the invention, a bistable multivibrator is connected between the output of the comparator and the control input of the control unit.

In accordance with another added feature of the invention, the bistable multivibrator is a flipflop.

In accordance with a further additional feature of the invention, the comparator, the bistable multivibrator and the control unit form an integrated circuit.

In accordance with a concomitant feature of the invention, the controllable switch is a field-effect transistor.

Other features which are considered as characteristic for the invention are set forth in the appended claims.

Although the invention is illustrated and described herein as embodied in a method for switching off a switched-mode power supply in the event of a short-circuit, and a switched-mode power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
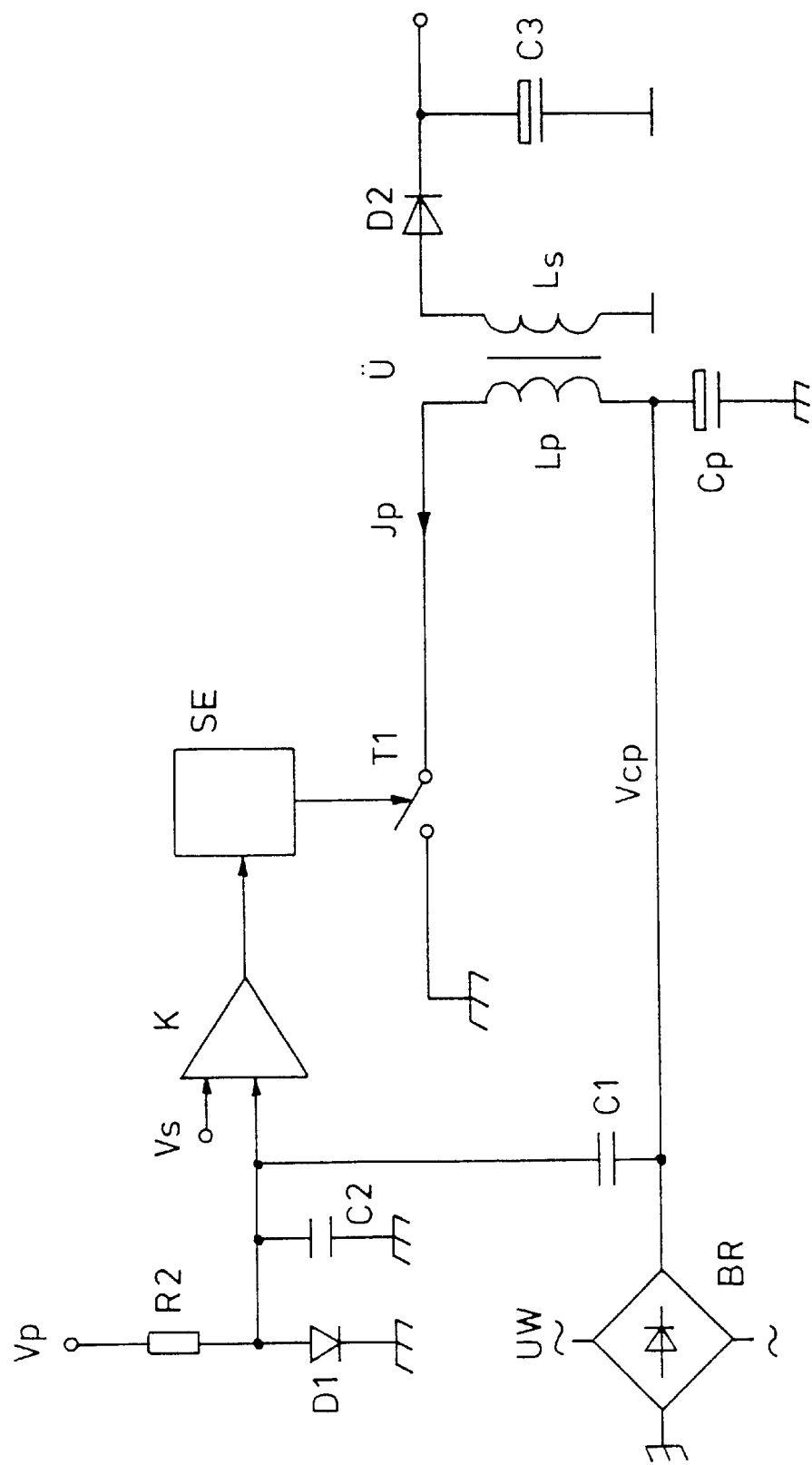
FIG. 1 is a circuit diagram of a first exemplary embodiment of a switched-mode power supply according to the invention.

In all the figures of the drawing, sub-features and integral parts that correspond to one another bear the same reference symbol in each case. Referring now to the figures of the drawing in detail and first, particularly, to FIG. 1 thereof, there is shown a first exemplary embodiment of a switched-mode power supply according to the invention. The switched-mode power supply has a voltage UW applied to AC voltage inputs of a bridge rectifier BR. DC voltage outputs of the bridge rectifier BR are connected to a parallel circuit formed of an electrolytic capacitor Cp and a series circuit formed of a primary winding Lp of a transformer Ü and of a controllable switch T1. A series circuit containing a diode D2 and a capacitance C3 is connected in parallel with a secondary winding Ls of the transformer Ü. A capacitive voltage divider containing a capacitance C1 and C2 is connected in parallel with the electrolytic capacitor Cp, and a center tap of the voltage divider is connected to a first input of a comparator K. A diode D1 is connected in parallel with the capacitance C2. A voltage Vp is applied via a resistor R2 to the first input of the comparator K, in order to clamp it at a rest potential. A reference voltage Vs is applied to a second input of the comparator K. The output of the comparator K is connected to a control input of a control unit SE, whose control output is connected to a control input of the controllable switch T1.

Since a short-circuit results in the primary current Ip through the electrolytic capacitor Cp rising severely, the voltage across the electrolytic capacitor Cp falls, and thus the potential at the center tap of the capacitive voltage divider containing the capacitances C1 and C2 also falls. If the potential at the center tap of the capacitive voltage divider falls below the reference voltage Vs, the comparator K emits a control signal to the control unit SE, which then immediately opens the controllable switch T1. This results in reliable short-circuit protection, irrespective of the point at which the short-circuit occurs in the switched-mode power supply.

Figure 2:
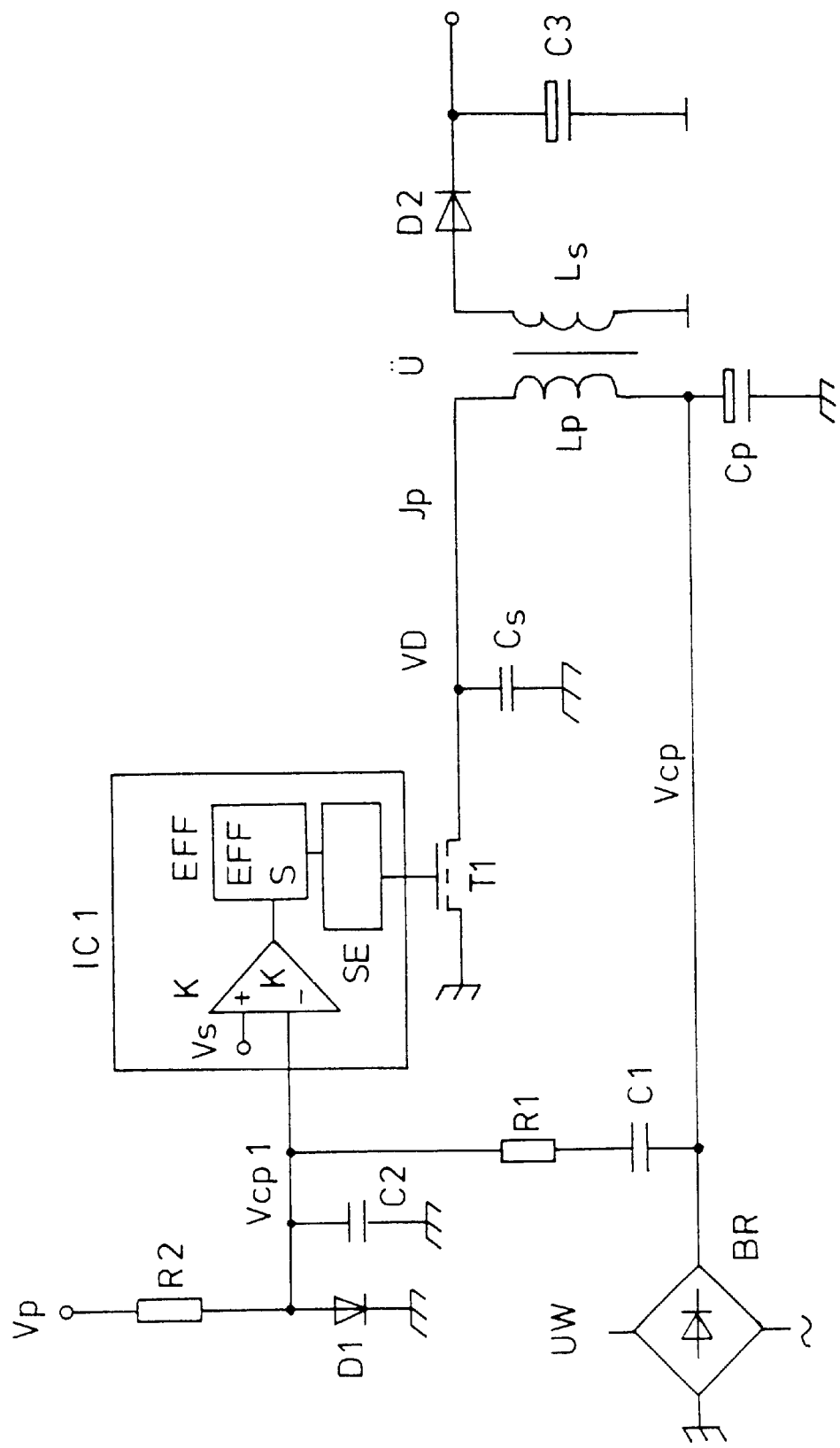
FIG. 2 is a circuit diagram of a second exemplary embodiment of the switched-mode power supply.

FIG. 2 shows a second exemplary embodiment of the switched-mode power supply according to the invention.

The AC voltage UW is applied to the AC voltage inputs of the bridge rectifier BR. The parallel circuit containing the electrolytic capacitor Cp and the series circuit containing the primary winding Lp of the transformer Ü and the path through a field-effect transistor T1 is connected to the DC voltage outputs of the bridge rectifier BR. A capacitance Cs is connected in parallel with the path through the controllable switch T1 in the form of a field-effect transistor T1. The capacitive voltage divider, which is in the form of the series circuit containing the capacitance C1, a resistor R1 and the capacitance C2, is connected in parallel with the electrolytic capacitor Cp. The common junction point of the resistor R1 and the capacitance C2 is connected to the first input of a comparator K, to whose second input the reference voltage Vs is applied. A diode D1 is connected in parallel with the capacitance C2. A voltage Vp is applied via the resistor R2 to the first input of the comparator K, whose output is connected to the set input of a bistable multivibrator EFF, for example a flipflop. An output of the bistable multivibrator is connected to the control input of the control unit SE, whose output is connected to a gate electrode of the field-effect transistor T1. On the secondary side of the switched-mode power supply there is the series circuit containing the diode D2 and the capacitance C3, across which the regulated output voltage of the switched-mode power supply can be tapped off, in parallel with the secondary winding Ls of the transformer Ü.

Figure 3:
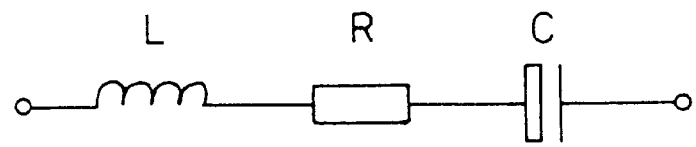
FIG. 3 is a circuit diagram of an equivalent circuit of an electrolytic capacitor.

FIG. 3 shows the equivalent circuit of an electrolytic capacitor which represents a series circuit containing an inductance L, an equivalent series resistance R and the actual capacitance C. When the current through the electrolytic capacitor Cp rises, as is the situation in the event of a short-circuit, the current through the equivalent series resistance R also rises, and causes a voltage drop across the resistance. Owing to the voltage drop across the equivalent series resistance R, the potential across the electrolytic capacitor Cp falls and is drawn to ground. When the voltage across the electrolytic capacitor Cp falls, the potential at the first input of the comparator K also falls. If the potential at the input of the comparator K falls below the reference voltage Vs, the comparator K emits a signal to the bistable multivibrator EFF, which emits a control signal to the control unit SE, which immediately switches off the field-effect transistor T1. When the field-effect transistor T1 is switched off, no current flows either in the primary circuit or in the secondary circuit of the switched-mode power supply, so that perfect short-circuit protection is achieved.

The quiescent potential at the first input of the comparator K is governed by the voltage Vp, the resistor R2 and the clamping diode D1. The capacitors C1 and C2 form the capacitive voltage divider. Together with the capacitance C2, the resistor R1 forms a low-pass filter for attenuating any RF components that are present. The capacitance Cs is used as a so-called snubber capacitor. Since a capacitive voltage divider is provided instead of a shunt resistor, the power loss in the short-circuit protection is negligibly small. The comparator K, the bistable multivibrator EFF and the control unit SE can be provided in a suitable manner in an integrated circuit IC1.

Figure 4:
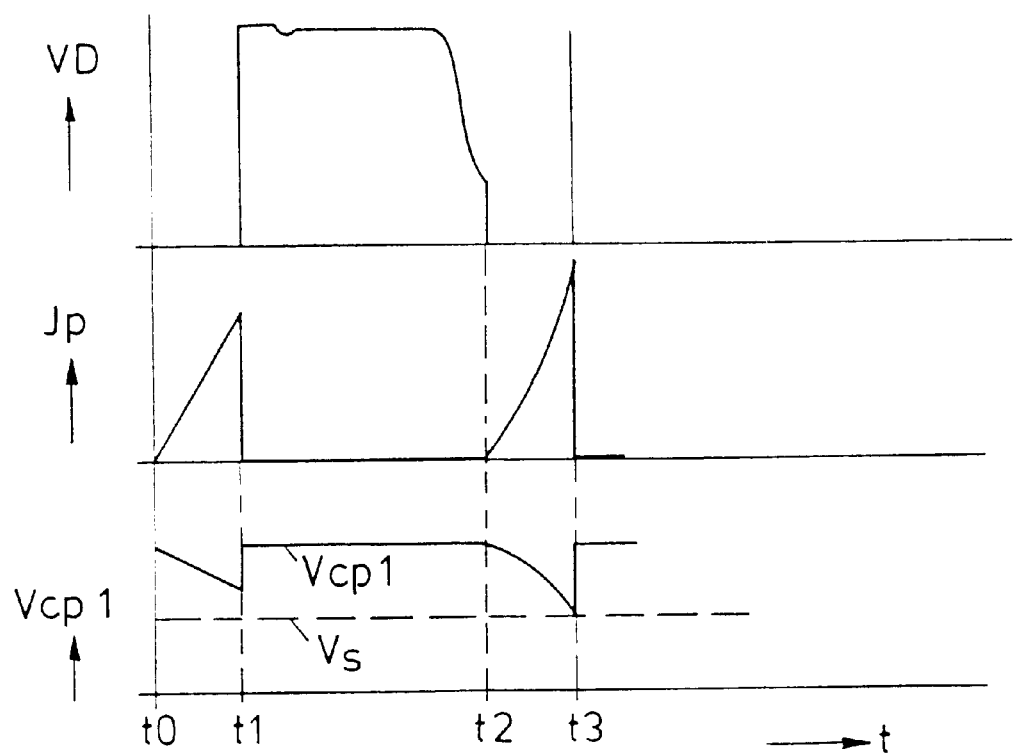
FIG. 4 is a graph of pulsed diagrams for the switched-mode power supply.

FIG. 4 shows pulse diagrams of the switched-mode power supply illustrated in FIG. 2.

In normal operation, the primary current Ip rises within the permissible limits between times t0 and t1.

Owing to a short-circuit, the primary current Ip rises severely between times t2 and t3. The voltage Vcp1 which is tapped off at the center tap of the capacitive voltage divider and is applied to the first input of the comparator K thus falls further. As soon as it falls below the reference voltage Vs at the time t3, the comparator K emits a control signal to the control unit SE, which switches off the field-effect transistor T1. The voltage VD across the primary winding Lp of the transformer Ü thus rises while, at the same time, the primary current Ip falls suddenly to the value 0, and the potential Vcp1 at the first input of the comparator K rises once again.

The switched-mode power supply according to the invention has the advantage that it is switched off immediately irrespective of the location of the short-circuit.

I claim:

1. A switched-mode power supply, comprising:
   a bridge rectifier having AC voltage inputs for receiving an AC voltage and DC outputs;
   an electrolytic capacitor;
   a transformer having a primary winding and a secondary winding;
   a first series circuit containing said primary winding of said transformer and a controllable switch having a control input, said first series circuit connected in parallel with said electrolytic capacitor and together defining a parallel circuit connected to said DC outputs of said bridge rectifier;
   a control unit having a control input and an output connected to said control input of said controllable switch;
   a second series circuit containing a diode and a first capacitance and connected in parallel with said secondary winding of said transformer;
   a capacitive voltage divider formed of a second capacitance, a center tap, and a third capacitance, said capacitive voltage divider connected in parallel with said electrolytic capacitor; and
   a comparator having a first input connected to said center tap of said capacitive voltage divider, a second input to be connected to a reference voltage, and an output connected said control input of said control unit.

2. The switched-mode power supply according to claim 1, including a resistor connected between said second capacitance and said third capacitance of said capacitive voltage divider.

3. The switched-mode power supply according to claim 2, including:
   a further resistor having a first terminal connected to said first input of said comparator and a second terminal to be connected to a voltage for applying the voltage to said first input of said comparator; and
   a further diode connected in parallel with said second capacitance of said capacitive voltage divider which is also connected to said first input of said comparator.

4. The switched-mode power supply according to claim 1, including a fourth capacitance connected in parallel with said controllable switch.

5. The switched-mode power supply according to claim 1, including a bistable multivibrator connected between said output of said comparator and said control input of said control unit.

6. The switched-mode power supply according to claim 5, wherein the bistable multivibrator is a flipflop.

7. The switched mode power supply according to claim 5, wherein said comparator, said bistable multivibrator and said control unit form an integrated circuit.

8. The switched-mode power supply according to claim 1, wherein said controllable switch is a field-effect transistor.

* * * * *